United States Patent

[11] 3,542,425

| | | |
|---|---|---|
| [72] | Inventor | William L. Pringle |
| | | Grosse Pointe, Michigan |
| [21] | Appl. No. | 752,037 |
| [22] | Filed | Aug. 12, 1968 |
| [45] | Patented | Nov. 24, 1970 |
| [73] | Assignee | Jim Robbins Seat Belt Co. |
| | | Troy, Michigan |

[54] LINEAR RETRACTOR CONSTRUCTION
11 Claims, 9 Drawing Figs.

[52] U.S. Cl. .................................................. 297/388,
280/150
[51] Int. Cl. ...................................................... A62b 35/00;
B60r 21/10
[50] Field of Search .......................................... 280/150;
297/388, 389

[56] References Cited
UNITED STATES PATENTS
3,371,960 3/1968 Bayer .......................... 280/150
3,400,977 9/1968 Jones ........................... 280/150
3,439,933 4/1969 Jantzen ........................ 280/150

*Primary Examiner*—Banjamin Hersh
*Assistant Examiner*—Robert R. Song
*Attorney*—Hauke, Krass, Gifford and Patalidis ABSTRACT: A safety seatbelt retractor is disclosed in which the belt is anchored by a bracket mounted adjacent an opening at one end of an elongated one-piece housing through which the belt moves as it is extended and retracted from within the housing. The belt extends from the bracket in a linear section toward a spring-biased yoke, is doubled around the yoke and then extends in a second linear section toward the opening. Motion of the yoke away from the bracket urges the outer free end of the belt toward the opening while motion toward the bracket allows the belt to be extended from the housing. A one-piece sheet metal latch mounted on the housing catches the yoke when the belt is fully extended to prevent its retraction until the latch is manually released.

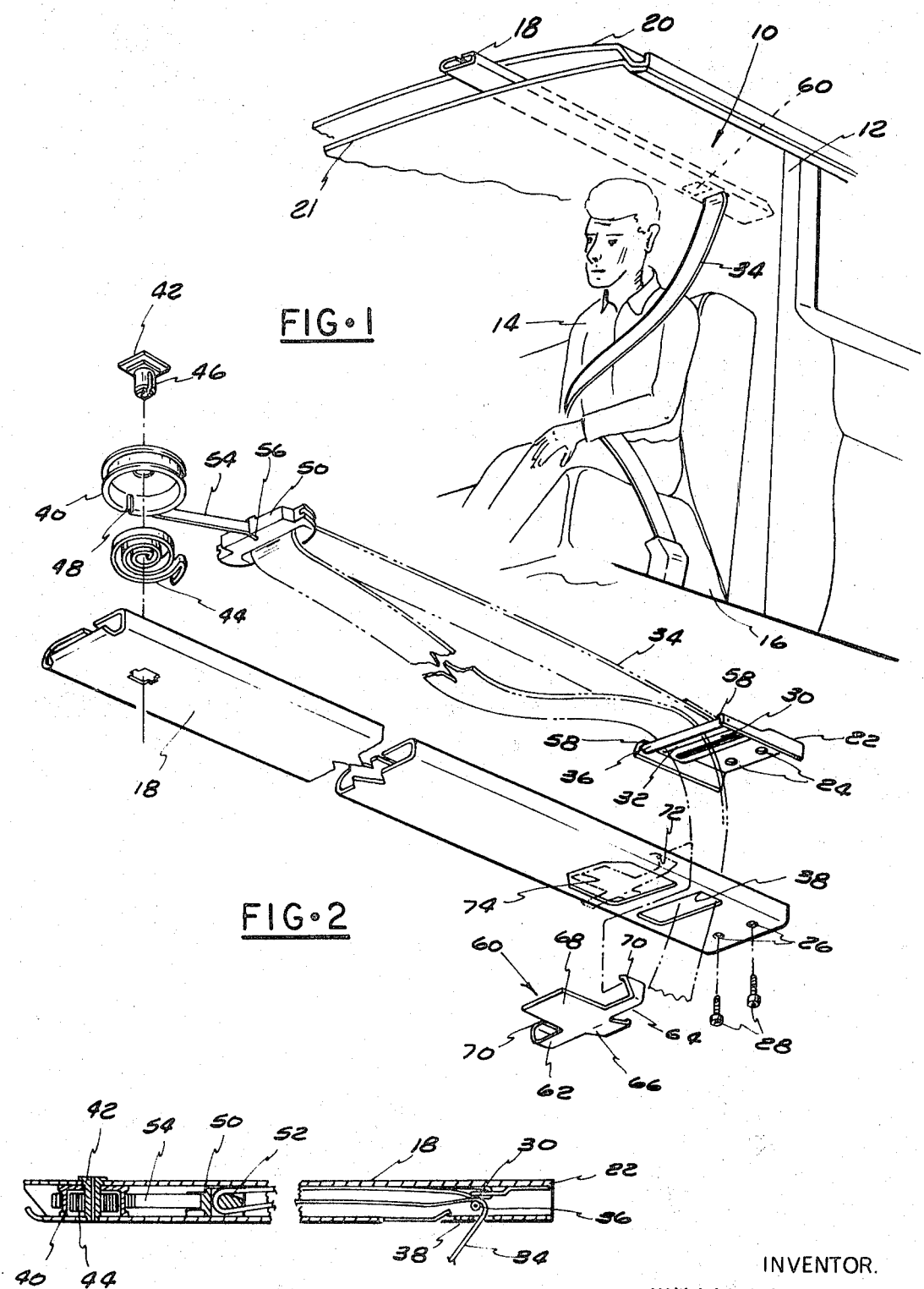

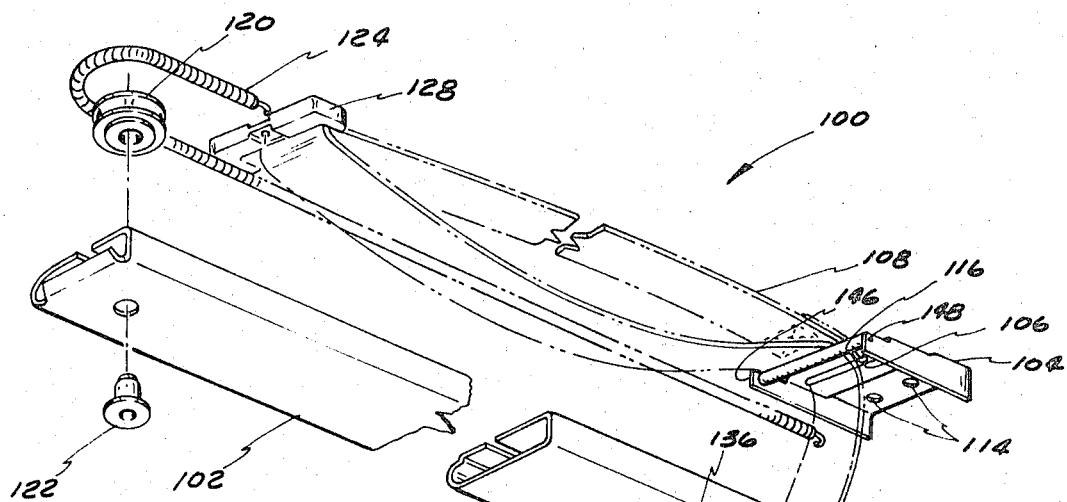
FIG·4
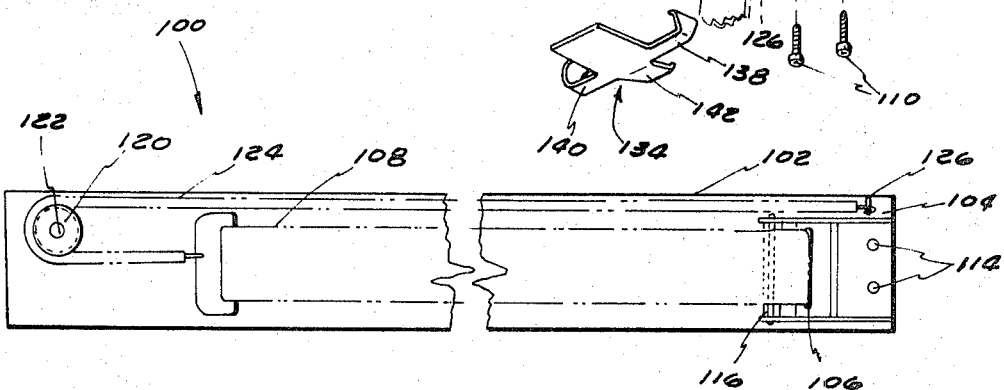
FIG·5
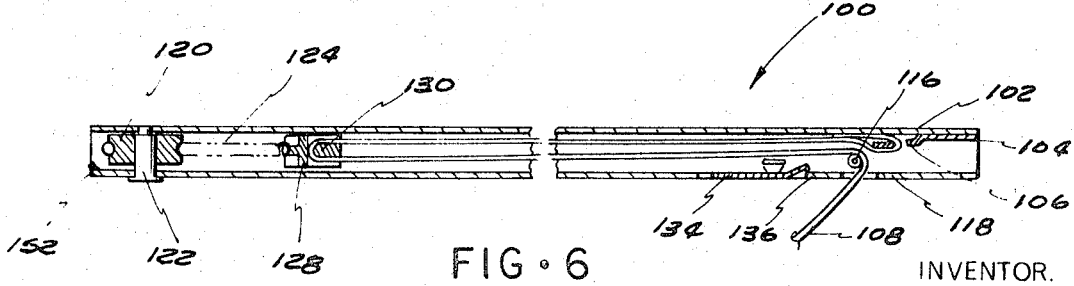
FIG·6
INVENTOR.
WILLIAM L. PRINGLE
BY
ATTORNEYS

INVENTOR
WILLIAM L. PRINGLE
BY

ATTORNEYS

3,542,425

LINEAR RETRACTOR CONSTRUCTION

BACKGROUND OF THE INVENTION

This invention relates to vehicle safety seatbelt systems and more particularly to such a system having a retracting device which comprises an elongated housing in which retracted portions of the belt are supported in linear sections parallel to the housing, movable retractor means in the housing for biasing extended portions of the belt toward the housing, and a latch mounted on the housing to catch the retractor means when the belt is fully extended to prevent the belt's retraction until the latch is manually released from the retractor means.

One form of vehicle safety seatbelt-retracting device disclosed in the prior art biases the belt toward a stored position in which the belt is supported in one or more linear sections within an elongated housing. Usually one end of the belt is anchored to the housing and the vehicle, and its other end carries a coupling element which is disposed outside of the housing. One advantage of retracting the belt toward a linear position is reflected in a reduction in the overall thickness of the housing, as compared to reel-type retractors where the belt is wound into the roll. This reduction in size allows the retractor to be mounted in a relatively thin area in the vehicle.

However, in this type of retractor it is necessary that the seat occupant fully extend the belt from the housing before he adjusts its length. If the belt is not fully extended, there is a possibility that in the event of an accident in which the occupant is suddenly displaced from the seat, the belt will not provide an effective restraining element because of the slack. One method of the prior art that has been disclosed to obviate this potential hazard is to provide a latch that engages the retracting means in the housing when the belt is fully extended and prevents the belt from being retracted until the latch is manually released. The occupant can then ascertain that the belt is fully extended either by an audible sound provided as the latch engages a retractor member in the housing, and also by the absence of a bias on the extended end of the belt. Such a retracting device is disclosed in the prior art in U.S. Pats. No. 3,065,027; 3,184,267, and in my copending patent application. The broad purpose of the present invention is to provide several improvements with respect to such retracting devices.

SUMMARY OF THE INVENTION

The preferred embodiment of the present invention, which will be described in greater detail, comprises a retracting device having a relatively flat, elongated housing that can be mounted in a relatively thin area in the vehicle such as between the headliner and the roof panel. The belt is biased into the housing by retracting means composed of a relatively few components each of which is manufactured from light weight materials so that the overall unit, in addition to being compact, is lighter in weight than conventional retractors and can be mass-produced with a minimum of cost.

The preferred retractor comprises a housing of a single sheet of metal that is bent to form an elongated, tubular case having open ends for receiving the internal retractor components when the device is assembled. A bracket is mounted adjacent one end of the housing. A pair of bolts which extend between opposite sides of the housing and through the bracket provide means for fastening the bracket and the housing to the vehicle. The bracket has a slot through which the end of the belt is looped and stitched.

A spring-biased reel is rotatably mounted adjacent the opposite end of the housing and is connected to one end of an elongated ribbon that is coiled around the reel as it rotates in one direction and uncoils from the reel as it rotates in the opposite direction. A one-piece yoke, slidably mounted in the housing between the bracket and the reel, is connected to the free end of the ribbon so that it is biased toward the reel and away from the bracket. The belt extends from its connection to the bracket in a linear section toward the yoke, is doubled around an arm on the yoke and then extends toward the bracket in a second linear section and through a belt-receiving opening adjacent the bracket. The spring-biased yoke urges the belt into the housing and thereby takes up any slack in the belt. The user extends the belt from the housing by pulling its free end which moves the yoke toward the belt-receiving opening and an extreme position in which it abuts the bracket. In this extreme position, in which the belt is fully extended from the housing, a latch member engages the yoke and prevents it from returning toward the reel until the latch has been manually released.

The latch member is formed of a single sheet of material with a pair of arms that extend in opposite directions and snap into slots on opposite sides of the housing so that a bent, catch section on the inner ends of the arms extends through an opening in the housing to a position in which it is disposed in the path of motion of the yoke. The yoke engages the catch section as it moves toward the bracket and moves it out of its path of motion until it is in its extreme position with the belt fully extended. The catch section then snaps up behind the yoke to prevent it from returning toward the reel under the influence of the spring.

The latch also has a release section which when depressed moves the catch section about an axis extending through the arms and away from the yoke. When the release section is released, the catch section returns to its position in the housing under the influence of the torsional resilience of the latch material.

Another embodiment of the invention, which is similar to the preferred embodiment, employs a pulley that is rotatably mounted adjacent the end of the housing. An elongated helical coil spring having one end anchored to the housing adjacent the bracket extends substantially the full length of the housing and around the pulley with its opposite end being connected to the yoke to bias the yoke toward the pulley. Thus as the yoke moves toward and away from the pulley, the pulley rotates to guide the spring as it is stretched and unstretched. This form of the invention is also relatively compact with the spring providing a substantially uniform bias on the belt throughout the travel of the yoke.

Still further advantages of the present invention will readily become apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 illustrates a seated occupant in the passenger compartment of a vehicle restrained by a seatbelt system employing a belt retracting device built in accordance with the invention;

FIG. 2 is an enlarged view of the retracting device of FIG. 1 with the various component elements shown in exploded relationship;

FIG. 3 is a longitudinal sectional view through the retracting device of FIG. 1 with a portion of the midsection of the device broken away;

FIG. 4 shows another embodiment of the invention with the various components shown in an exploded relationship;

FIG. 5 is a plan view of the embodiment of FIG. 4 showing the various components assembled in the housing;

FIG. 6 is a longitudinal sectional view of the embodiment of FIG. 4;

FIG

DESCRIPTION OF THE PREFERRED EMBODIMENT

Figure 7:
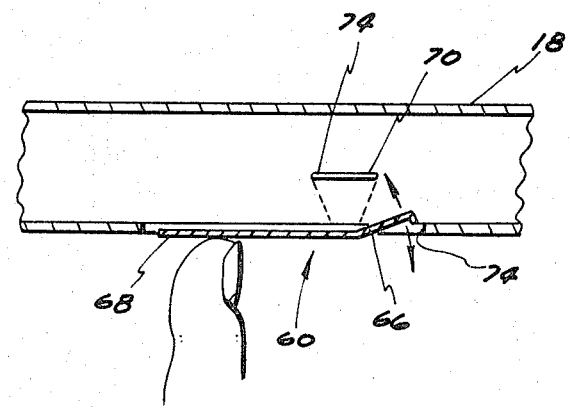
FIG. 7 is an enlarged showing the one-piece latch and the manner in which which it moves with respect to the housing.

Now referring to the drawings, a seatbelt system generally indicated at 10, is illustrated in FIG. 1 as being mounted within the passenger compartment of a vehicle 12 to provide a restraining means for an occupant 14 on a seat assembly 16. The seatbelt system includes an elongated retractor housing 18 that is fastened to the vehicle between the roof panel 20 and the headliner 21. It is to be understood however that the system could be mounted in other locations within the vehicle, such as in the seat back, where a relatively thin, elongated mounting area is available.

As best shown in FIGS. 2 and 3, the retractor housing 18 is preferably formed of a single sheet of steel bent into a substantially flat, tubular configuration with a uniform, rectangular cross section throughout its length. Both ends of the housing are open to receive various internal components to positions within the housing at assembly.

A metal bracket 22, mounted adjacent one end of the housing, has a pair of openings 24 which register with a pair of openings 26 in the lower wall of the housing in a pair of openings (not shown) in the upper wall of the housing for receiving a pair of threaded fasteners 28. The fasteners 28 pass through the openings in the housing 18 and the openings 24 in the bracket 22 to provide means for fastening the housing 18 and the bracket 22 to the vehicle.

Bracket 22 has a planar section 30 formed with a slot 32 that is transverse to the longitudinal axis of the housing. An elongated seat belt 34 is looped through the slot and then stitched to itself so that it is connected to the bracket. A metal roller 36 is journaled in a pair of arms of the bracket 22 over a rectangular opening 38 formed in the bottom wall of the housing. The opening 38 provide provides means for the belt 34 to move into and out of the housing 18 with the roller 36 providing guide means for the belt.

A hollow reel 40, preferably formed of a single section of plastic, is rotatable on an arbor 42, also of a suitable plastic, which is supported on the upper and lower walls of the housing 18. The reel 40 is rotatable about an axis that is perpendicular to the wall of the housing that contains the opening 38.

A coil spring 44 is disposed within the reel with one end hooked in a slot 46 in the arbor and its other end hooked in a slot 48 in the wall of the reel so that the reel is biased in one direction of its rotation. The spring 44 is slightly pretensioned at assembly time.

A yoke 50, preferably formed of a lightweight, low-friction material such as a Teflon plastic, is slidably mounted in the housing 18 between the reel 40 and the opening 38. The yoke 50 has an integrally formed arm 52 which faces the roller 36 on the bracket, and a cross section which is similar to the transverse cross section of the housing.

An elongated metal ribbon 54 provides a connection between the reel 40 and the yoke 50. One end of the ribbon 54 is hooked in the slot 48 in the wall of the reel and its other end is doubled to form an enlargement which seats in a hole 56 formed in the midsection of the yoke 50. The spring 44 biases the reel so that as it rotates it coils the ribbon 54 about its outer circumference, and thereby moving the yoke 50 toward the reel and away from the opening 38 in the housing. Movement of the yoke 50 toward the opening 38 uncoils the ribbon 54 from the reel and against the bias of the spring 44.

As best seen in FIG. 3, the belt 34 extends from its connection with the bracket 22 in a linear section towards the yoke 50, is doubled around the arm 52 of the yoke, and then extends in a second linear section toward and around the roller 36 and out through the opening 38. The bias of the spring 44 on the yoke 50 tends to retract the belt into the housing through the opening 38 by moving the yoke 50 toward the reel 40, and allows the belt 34 to be extended from the housing 18 by allowing motion of the yoke toward the opening 38. As the yoke is moved towards the bracket 22 by extension of the belt 34, it approaches an extreme position in which it abuts the ends 58 of the bracket 22. In this extreme position, the belt 34 is substantially fully extended from the housing.

A latch member 60, mounted adjacent the opening 38, is operable to retain the yoke 50 in its extreme position in abutment with the bracket. The latch member 60 is preferably formed from a single sheet of spring steel and has a pair of arms 62 and 64 that extend in opposite directions from a catch section 66 and a release section 68. The extreme ends of the arms 62 and 64 have bent sections 70 that snap into a pair of slots 72 on opposite sides of the housing 18.

The arms 62 and 64 support the catch section 66 and the release section 68 so that they extend in opposite longitudinal directions with respect to the housing 18. The catch section is bent so that it extends through an opening 74 in the housing to a position in which it is disposed in the path of motion of the yoke 50. The catch section 66 and the release section 68 are torsionally resilient about an axis that passes through the arms 62 and 64 such that when the release section 68 is moved with respect to the arms, the catch section 66 is moved with the release section.

Referring to FIG. 7, as the yoke 50 approaches the bracket 22 it engages the upper surface of the catch section 66 and moves it downwardly toward the opening 74 so that the yoke can continue its motion toward the bracket. Once the yoke 50 has passed the catch section, the catch section springs back up into the housing behind the yoke and in so doing provides an audible sound so that the occupant 14 can ascertain that the belt is fully extended. As the catch section springs up behind the yoke 50, it assumes a position in which it prevents the yoke from being returned toward the reel until it is manually released by an upward release effort applied on the release section 68. The upward release effort on the release section 68 causes the catch section to rotate downwardly until it clears the yoke to allow it to return toward the reel and retract the belt 34 into the housing 18.

Thus it can be seen that the latch member 60 provides a novel means for controlling the return of the yoke. It can be easily manufactured from a single sheet of material, readily assembled and disassembled from the housing 18 without any special fastening means and without a separate spring-biasing means by taking advantage of the inherent resilience of the latch material.

FIGS. 4 to 6, and 8 and 9, show another embodiment of the invention which is similar to the preferred embodiment of the FIGS. 1 to 3, but has a modified retracting means. The embodiment 100 comprises an elongated housing 102 formed of a single sheet of metal so that it has a substantially uniform cross section its full length.

A bracket 104 is mounted adjacent one end of the housing 102 and is formed with a slot 106. The slot 106 has a length which accommodates the width of a seatbelt 108 and provides means for connecting the end of the seatbelt to the bracket. The end of the seatbelt is looped through the slot 106 and then stitched to itself to form a closed loop. A pair of threaded fasteners 110 are receivable through a pair of openings 112 in the housing 102, a pair of openings 114 in the bracket, and a second pair of openings (not shown) in the housing to provide means for fixedly attaching the housing 102 and the bracket 104 to the vehicle.

A roller 116 is journaled on the bracket 104 adjacent an opening 118 in the housing. The opening 118 provides means for the belt 108 to move into and out of the interior of the housing and the roller 116 provides a guide for the belt as it moves through the opening 118.

A pulley 120 is rotatably supported on an arbor 122 at the opposite end of the housing 102 with respect to the bracket 104. The pulley has a diameter which is approximately one-half the width of the housing and it is mounted so that it rotates about an axis that is laterally spaced with respect to the longitudinal centerline of the housing.

An elongated, cylindrical, helical spring 124, preferably formed of music wire, is disposed in the housing 102 with one end being connected to a tab 126 adjacent the bracket 104, its body extending substantially the full length of the housing, and around the pulley 120, and its other end being connected to a yoke 128. The yoke 128 has an arm 130 which is parallel to the arm 116 on the bracket. The belt 108 extends from the bracket toward the pulley 120, is doubled around the arm 130 of the yoke, then extends back and around the roller 116 and out through the opening 118. The yoke 128 is preferably formed of a single section of a low-friction material so that it readily slides in the housing between the pulley 120 and the opening 118.

Figure 9:
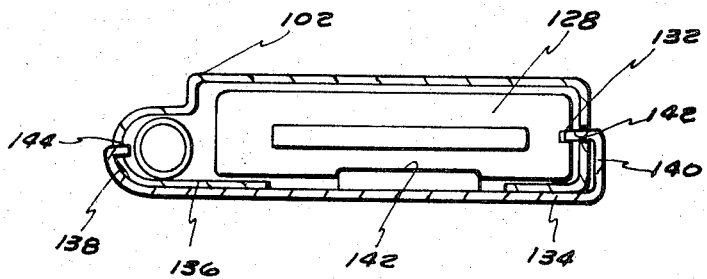
FIG. 9 is a view taken along lines 9–9 of FIG. 8.

As best seen in FIG. 9, one side of the yoke 128 has a notch 132 to form a clearance between the inner end of a latch 134, which spans an opening 136 in the housing and the yoke as the yoke approaches the bracket. The latch 134 is similar to the latch 68 in the embodiments of FIGS. 1 and 3 and is formed of a single sheet of spring steel with a pair of arms 138 and 140 that extend in opposite directions from a latch section 142. the arms 138 and 140 have inwardly bent ends 142 and 144 that snap into slots formed on opposite sides of the housing 104. The arms 138 and 140 support the latch section 142 in a position such that it extends into the path of motion of the yoke 128.

Figure 8:
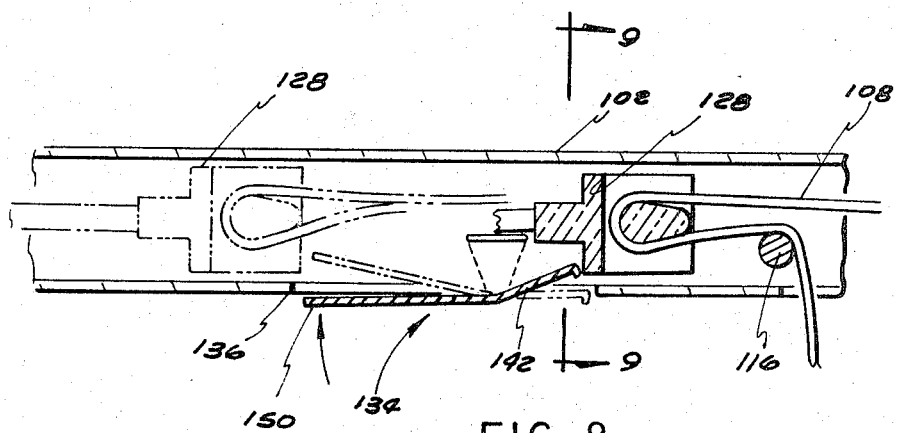
FIG. 8 is a view of the preferred latch and the manner in which it catches the yoke.

As best shown in FIG. 8, when the yoke 128 approaches the opening 118 toward an extreme position in which it abuts the ends 146 and 148 of the bracket, it engages the upper side of the latch section 142 and moves it downwardly toward the opening 136 to a position that allows the yoke to continue its motion toward the bracket 104. As the yoke passes the latch section 142 it snaps upwardly behind the yoke. In this extreme position, the belt 108 is substantially fully extended from the housing.

As the latch section 142 snaps upwardly it provides the occupant of the seatbelt with means for ascertaining that the belt is fully extended by the absence of the bias of the spring 124 acting on the belt to retract it into the housing. By applying an upward release force on a release section 150 of the latch member, the occupant can rotate the latch section 142 about an axis which extends through the arms 138 and 140 downwardly toward the opening 136 to a position that allows the yoke 128 to return toward the pulley 120 and thereby retract the belt into the housing.

The advantage of employing the elongated spring 124 is reflected in a reduced number of component parts and a more uniform bias on the yoke 128 throughout the full length of its travel within the housing as compared to conventional spirally wound springs. The retracting device 100 also has the other advantages of the simplified construction of the embodiment of FIGS. 1 to 3, including a one-piece housing, the one-piece latch, and the yoke which is formed of a single piece of low-friction material. The internal components of the retracting device 100 are inserted through the open ends of the housing at assembly to a position in which they are mounted in place. A tab 152 on the end of the housing is then bent inwardly to assist in retaining the internal members within the housing.

Although I have described two embodiments of my invention, it is to be understood that various changes and revisions can be made therein without departing from the spirit of the invention.

I claim:

1. In a safety seatbelt system adapted for mounting in a vehicle, the combination comprising:
  a. an elongated seatbelt;
  b. an elongated housing having first and second ends and a first opening for allowing motion of the belt into the housing and a second opening;
  c. retractor means in said housing coupled to said belt and movable along a path in a first direction toward a first position to retract portions of the belt into the housing, and in a reverse direction toward a second position to allow portions of the belt to be extended from the housing;
  d. bias means urging said retractor means toward said first position; and
  e. a latch member formed of a single sheet of material with a pair of arms extending in opposite directions from a catch section, the arms being disposed exteriorly of said housing and attached to opposite sides of the housing to support the catch section for movement in said second opening, said arms being disposed along an axis and said catch section being laterally offset from said axis so that said catch section is movable relative to said housing in an arcuate path generally about said axis, said catch section being movable between a position in the path of motion of the retractor means for engaging said retractor means to prevent motion of the retractor towards its first position and a position out of engagement with the retractor means to allow motion of retractor means toward its first position.

2. The invention as defined in claim 1, in which the retractor means in its second position allows substantially the full length of the belt to be extended out of the housing through said first opening.

3. The invention as defined in claim 1, in which said latch member has a release section so formed that a motion of the release section moves the catch section out of an engagement with the retractor means to allow the retractor means to move towards its first position.

4. The invention as defined in claim 3, in which the latch member is formed from a sheet of spring steel with the catch section and the release section extending in opposite directions from a position between said arms, said catch section and said release section being movable together about an axis through said arms whereby a motion of the release section in one direction about said axis moves said catch section in the same direction about said axis.

5. The invention as defined in claim 4 wherein said second opening is adjacent the second position of the retractor means and the ends of said arms are attachable with the housing on opposite sides of said second opening to support the catch section in a position in which it extends into the housing and in the path of motion of the retractor means.

6. The invention as defined in claim 1 including a bracket mounted in said housing and connected to the end of the belt and said housing is formed of a single sheet of material into an elongated tubular case having an open end for receiving the bracket into the housing.

7. The invention as defined in claim 6, including fastener means which extend from one side of the housing to its opposite side and through the bracket means for attaching the housing to the vehicle.

8. The invention as defined in claim 1, in which said retractor means include a yoke, formed of a single piece of material, which is slidably mounted in said housing for motion between the first and second positions of said retractor means, said yoke having portions engageable with said belt to retract portions of the belt into the housing as the yoke is moved in one direction and to allow portions of the belt to be extended from the housing as the yoke is moved in the opposite direction.

9. The invention as defined in claim 1, in which the housing has a uniform cross section between the first and second positions of the retractor means and the retractor means includes a yoke, around which the belt is doubled, formed of a single piece of material with a cross section similar to the uniform cross section of the housing, said yoke being slidably mounted in the housing between the first and second positions of the retractor means.

10. The invention as defined in claim 1, in which the first opening for said belt is formed adjacent said first end of said housing, and a bracket mounted in the housing between said first opening and the first end of the housing and connected to the end of the belt, and a roller journaled on the bracket across said first opening for guiding the belt as it is moved into and out of said housing.

11. The invention as defined in claim 1, in which said retractor means includes a spring-biased reel supported in said housing in a position longitudinally spaced from said first opening through which the belt moves into and out of the housing, a yoke slidably mounted in the housing between said opening and said first reel, and an elongated ribbon having one end connected to the yoke and its other end connected to the reel to coil thereon as the yoke is moved toward the reel and to be uncoiled therefrom as the yoke is moved away from the reel.